United States Patent
Fan et al.

(10) Patent No.: US 11,245,522 B2
(45) Date of Patent: Feb. 8, 2022

(54) METHOD AND SYSTEM FOR SECURELY STORING DATA USING A SECRET SHARING SCHEME

(71) Applicant: LEADING SOFTWARE LIMITED, Edinburgh (GB)

(72) Inventors: Lu Fan, Glasgow (GB); David Lanc, Glasgow (GB)

(73) Assignee: LEADING SOFTWARE LIMITED, Edinburgh (GB)

( * ) Notice: Subject to any disclaimer, the term of this patent is extended or adjusted under 35 U.S.C. 154(b) by 252 days.

(21) Appl. No.: 16/464,088

(22) PCT Filed: Nov. 24, 2017

(86) PCT No.: PCT/GB2017/053543
§ 371 (c)(1),
(2) Date: May 24, 2019

(87) PCT Pub. No.: WO2018/096353
PCT Pub. Date: May 31, 2018

(65) Prior Publication Data
US 2019/0288841 A1 Sep. 19, 2019

(30) Foreign Application Priority Data
Nov. 24, 2016 (GB) .................................... 1619903

(51) Int. Cl.
*G06F 21/00* (2013.01)
*H04L 29/06* (2006.01)
(Continued)

(52) U.S. Cl.
CPC .............. *H04L 9/0894* (2013.01); *G06F 7/00* (2013.01); *G06F 7/722* (2013.01); *H04L 9/0869* (2013.01)

(58) Field of Classification Search
CPC ....... H04L 9/0894; H04L 9/0869; G06F 7/00; G06F 7/722
See application file for complete search history.

(56) References Cited

U.S. PATENT DOCUMENTS

| | | | |
|---|---|---|---|
| 2010/0046739 A1 | 2/2010 | Schneider | |
| 2010/0329454 A1* | 12/2010 | Takashima | H04L 9/3073 380/44 |
| 2015/0293826 A1* | 10/2015 | Sincan | G06F 11/263 714/712 |

OTHER PUBLICATIONS

Constantin Catalin Dragan and Ferucio Laurentiu Tiplea, On the Asymptotic Idealness of the Asmuth-Bloom Threshold Secret Sharing Scheme, 2014, University of Iasi, pp. 1-15 (Year: 2014).*

* cited by examiner

*Primary Examiner* — Jeffrey C Pwu
*Assistant Examiner* — Rodman Alexander Mahmoudi
(74) *Attorney, Agent, or Firm* — BakerHostetler

(57) ABSTRACT

A method of securely storing a target number is provided based on the Chinese-Remainder Theorem, A set of n congruence pairs of numbers are generated, wherein a target number (a secret) can be uniquely derived from any t out of the n pairs. In one aspect the divisors are pre-selected such that any randomly selected n integers from the sequence are a valid Asmuth-Bloom sequence for any access structure (t, n) where $1 < t \leq n \leq N$. In another aspect, means are provided for pre-storing members of a Mignotte or Asmuth-Bloom sequence of N divisors in a look-up table from which n divisors can be selected. In this way a flexible access structure is supported. CRT secret shares for a selected access structure can be generated without having to perform the laborious process of calculating Mignotte sequences for each secret and access structure. Storage required to store (Continued)

the secret shares is also reduced by storing and retrieving congruence pairs in the form of an index and a remainder.

18 Claims, 7 Drawing Sheets

(51) Int. Cl.
*H04L 9/08* (2006.01)
*G06F 7/72* (2006.01)
*G06F 7/00* (2006.01)

METHOD AND SYSTEM FOR SECURELY STORING DATA USING A SECRET SHARING SCHEME

CROSS-REFERENCE TO RELATED APPLICATIONS

This application is a National Stage of International patent application PCT/GB2017/053543, filed on Nov. 24, 2017, which claims priority to foreign Great Britain patent application No. GB 1619903.6, filed on Nov. 24, 2016, the disclosures of which are incorporated by reference in their entirety.

FIELD OF THE INVENTION

This present invention related to a secret sharing scheme based on the Chinese Remainder Theorem. It provides a core building block for a next-generation Cloud data storage infrastructures by remarkably outperforming existing Computational Secret Sharing schemes.

BACKGROUND TO THE INVENTION

In the era of "Big Data", electronic information is increasingly dependent on massively distributed computing infrastructures, such as the Cloud, for storage and access. However, Cloud computing, especially public Cloud, bring disadvantages, primarily concerning data security and reliability. The Cloud Security Alliance published a report on the nine top threats to Cloud security, in which "data breaches" and "data loss" ranked the first and second place in order of the most treacherous threats (2014 survey). Furthermore, IBM and Ponemon Institute carried out the 2015 Cost of Data Breach Study, of which the results suggested that the average cost of per lost or stolen record is $154. The situation could be much worse for sectors that feature highly private and sensitive data, e.g. in the financial and healthcare industries. Worryingly, tens of millions of such valuable records can be lost in a single incident. For instance, on Apr. 25, 2016, a 132 GB database containing personal information of 93.4 million Mexican citizens was reported as having been leaked from an Amazon Cloud server. In the UK, 74% of small businesses and 90% of large ones had a Cyber-breach in 2015, and thus the UK Chancellor pledged "to establish UK's first National Cyber Centre" and "to increase spending on Cybersecurity to £1.9 billion by 2020."

Cloud data security is a global challenge. There remains a need to build a secure, reliable and high-performance Cloud-based data storage infrastructure, which is able to withstand a wide range of attacks from both outsiders and insiders, ensuring that critical information persists, is continuously accessible, has high resilience against destruction, and is kept confidential, even when a considerable proportion of the system has failed or been compromised.

Such a system has been described as a "survivable storage system" (Wylie, et al., 2000). It is argued that no individual service, node, or user can be fully trusted and sensitive data must be encoded and distributed across a set of independent storage nodes, where degradation is monitored and repaired over time. Since the early 2000s, a number of survivable storage systems have been developed based on these fundamental principles. Furthermore, it has been widely accepted that threshold secret sharing schemes are able to protect data in the Cloud, as they potentially provide improvements over conventional encryption and replication strategies, because they are not prone to problems such as key management, brute force attacks, and insider attacks (Alsolami & Boult, 2014) (Nirmala, et al., 2012).

Despite academic research in this area, the computing resource and performance intensive nature of threshold secret sharing schemes, and the need to develop extensible systems beyond the limitations of such schemes to handle very large data files and types has been a barrier to developments beyond controlled research experimentation.

The concept of a secret sharing scheme was first proposed by A. Shamir in 1979 and independently by G. R. Blakley later in 1979. Secret sharing refers to a technique by which a dealer spreads shares, which are pieces of a secret, to participants in a way that only authorised subsets of participants can recover the secret.

Furthermore, a (t, n) threshold secret sharing scheme means: a secret S is shared among a set of n participants in such a way that any subset consisting of t participants can reconstruct the secret S, but no subset of smaller size can reconstruct S.

Generally speaking, existing threshold secret sharing schemes fall into the following categories:

1. Polynomial interpolation based schemes, represented by Shamir's Perfect Secret Sharing (PSS) (Shamir, 1979)—To generate the secret shares, create a polynomial of degree t−1 with the secret as the first coefficient, pick other coefficients at random, find n points on the curve, and give one point to each of the participants as a share. To reconstruct the secret, any t participants can submit their individual points into a LaGrangian interpolation formula to recover the polynomial, and thus reveal the first coefficient as the original secret.

2. Hyperplane geometry based schemes, represented by Blakley's scheme—The secret is encoded as the coordinate of a single point, where n nonparallel (n−1)-dimensional hyperplanes intersect; each participant is given enough information to define a hyperplane; and the secret is recovered by calculating the planes' point of intersection and then taking a specified coordinate of that intersection.

3. Systematic coding based schemes, represented by Reed-Solomon Error Correcting Codes (Reed & Solomon, 1960)—To generate the secret shares, firstly wrap up the original secret into a data matrix of t rows; secondly, generate a Vondermonde coding matrix of n rows and t columns; thirdly, multiply the coding matrix with the data matrix to create the share matrix of n rows; finally, distribute each row of the share matrix to the n participants. To reconstruct the secret, any t participants can submit their shares to build a partial share matrix, which is then multiplied to the inverse coding matrix so as to reveal the original data matrix.

4. Chinese Remainder Theorem based schemes, represented by Asmuth-Bloom secret sharing (Asmuth & Bloom, 1983)—A secret value S can be uniquely determined using the system of congruences:

$$\begin{cases} S \equiv S_1 \bmod m_1 \\ \quad \vdots \\ S \equiv S_n \bmod m_n \end{cases}$$

where $m_1, m_2, \ldots, m_n$ are n pairwise coprime integers which satisfy:

$$\prod_{i=n-t+2}^{n} m_i < S < \prod_{i=1}^{t} m_i$$

Each $(S_i, m_i)$ makes a secret share, and any t shares can be used to reconstruct the original secret value S.

Let $M = \prod_{i=1}^{t} m_i$; $M_i = M/m_i$; $N_i = M_i^{-1}$, i.e. the modular multiplicative inverse of $M_i$ so that $N_i*M_i = 1 \mod m_i$; and $k \in \mathbb{Z}$. Then, $S = k*M + \Sigma_{i=1}^{t}(S_i*N_i*M_i)$ Or, $S = \Sigma_{i=1}^{t}(S_i*N_i*M_i) \mod M$ The Asmuth-Bloom secret sharing scheme further allows a secret value S to be chosen conveniently from the quotient ring $\mathbb{Z}/m_0\mathbb{Z}$, as long as:

$$m_0 * \prod_{i=n-t+2}^{n} m_i < S + \alpha*m_0 < \prod_{i=1}^{t} m_i$$

In this case, $\alpha$ is a random integer, and the secret value is reconstructed by:

$S = \Sigma_{i=1}^{t}(S_i*N_i*M_i) \mod M \mod m_0$

Not all four categories of threshold secret sharing schemes are equally applicable in building a secure, reliable and high-performance Cloud data storage Infrastructure, due to a number of security and performance issues.

Firstly, in a perfectly secure secret sharing scheme, any subset of participants with fewer than t shares should have no extra information about the secret than someone with zero shares. In other words, given any t−1 shares, no information whatsoever should be determined about the secret, and thus the final share must contain as much information as the secret itself, which means effectively each share of the secret must be at least as large as the secret itself. From this point of view, polynomial interpolation based schemes, hyperplane geometry based schemes and Chinese Remainder Theorem based schemes can be perfectly secure, whereas systematic coding based schemes are inherently insecure, and cannot be applied in isolation where data confidentiality is of great importance.

Secondly, hyperplane geometry based schemes are less space-efficient than polynomial interpolation based schemes in an equivalent application set up. Specifically, a share of the former is t times larger than a share of the latter. Hence, to keep the storage and communication overheads low, polynomial interpolation based schemes are always preferred over hyperplane geometry based schemes in practice.

Thirdly, traditional Chinese Remainder Theorem based schemes are less time-efficient than polynomial interpolation based schemes in an equivalent application set up. This is because:
  generating a valid Mignotte sequence is a computationally intensive and time-consuming process;
  it is difficult, without compromising security, to reuse a previously generated sequence, because it is subject to a particular (t, n) configuration, as well as a limited range for the secret values; and
  Chinese Remainder Theorem relies on big integer arithmetic, which tends to be more processor and memory intensive than polynomial interpolation.

Consequently, in the literature mainly polynomial interpolation based schemes were regarded as a feasible solution, and thus were thoroughly studied, understood in-depth, and applied in practice. So far, Shamir's PSS has been the most frequently used scheme by secure, reliable and high-performance Cloud data storage systems, with its known weaknesses mitigated by Rabin's Information Dispersal Algorithm (IDA) (Rabin, 1989) and Krawczyk's Computational Secret Sharing (CSS) (Krawczyk, 1993) techniques.

However, the inventors strongly believe that Chinese Remainder Theorem based schemes have great potential, and the present invention aims to bring such potential into full play. For the first time, the optimised Asmuth-Bloom secret sharing scheme is made an all-around superior option over Shamir's PSS, providing better performance, throughput and security.

SUMMARY OF THE INVENTION

According to a first aspect of the present invention, a method of securely storing a target number is provided that comprises creating a set of n Chinese-remainder congruence pairs of numbers (secret shares), each pair comprising a divisor and a remainder wherein the target number can be uniquely derived from any t out of the n pairs, wherein the divisors of the congruence pairs are members of an Asmuth-Bloom sequence of N members. The divisors are pre-selected such that any randomly selected n integers from the sequence are a [single] valid Asmuth-Bloom sequence for any access structures (t, n) where $1 < t \leq n \leq N$.

The sequence of numbers from which to select the n integers, or a subset thereof is preferably pre-stored.

In storing the secret shares, divisors are stored as indices in the sequence of N members.

As will be explained, the remainder is preferably calculated from the divisor by applying an integer $\alpha$, calculating $S' = S + \alpha*m_0$, where S is the target number, and $m_0$ is the lowest value in the sequence.

A computer system for securely storing a target number is also provided. The system comprises: means for pre-storing members of an Asmuth-Bloom sequence of N divisors in a look-up table; means for selecting n divisors from the stored sequence; means for creating a set of n Chinese-remainder congruence pairs of numbers, each pair comprising a different one of the selected n divisors and a remainder, such that the target number can be uniquely derived from any t out of the n pairs; and means for storing the n pairs of numbers.

A plurality of look-up tables of Asmuth-Bloom sequences may be stored, each corresponding to a respective access structure (t, n) where $1 < t \leq n \leq N$.

The stored sequence of N divisors are more preferably pre-selected for storage such that any randomly selected n integers from the sequence are a valid Asmuth-Bloom sequence for any access structures (t, n) where $1 < t \leq n \leq N$.

The values for t and n may be input or selected prior to creating the pairs of numbers.

The system preferably comprises means for: selecting an integer $\alpha$ as a function of t; calculating the remainder from the divisor by calculating $S' = S + \alpha*m_0$ where S is the target number and $m_0$ is the lowest value in the sequence. Preferably $\alpha$ is selected to ensure that $S + \alpha*m_0$ lies within a valid range for an Asmuth-Bloom sequence for a selected access structures (t, n). More preferably, it is selected such that $S + \alpha*m_0$ is greater than the product of the base number and the largest (t−1) of the n integers of the sequence, and smaller than the product of the smallest (t) of the n integers of the sequence.

The integer α is any random integer that can be selected by the system, but it is preferred that the condition $m_0 * \Sigma_{i=n-t+2}^{n} m_i < S' \Pi_{i=1}^{t} m_i$ is satisfied.

The reason for selecting α to satisfy this condition during encoding is because otherwise a wrong set of M, $M_i$ and $N_i$ might still allow S to be recovered accidentally. By selecting a value for α that ensures $m_0 * \Pi_{i=n-t+2}^{n} m_i < S' < \Pi_{i=1}^{t} m_i$ eliminates such a possibility.

The random integer α need be known only to the system while generating the secret shares. Indeed, it is preferably not known to the storage means where the shares are stored. Note that it is not required in the reconstruction formula:

$S = \Sigma_{i=1}^{t} (S_i * N_i * M_i) \mod M \mod m_0$

Target data is preferably represented as one or more binary target numbers, wherein the lowest value, $m_0$ of the sequence has at least one more bit than each target number.

The present invention provides a method to enhance comprehensively and significantly the performance, throughput and security of a traditional Asmuth-Bloom secret sharing scheme or other Chinese Remainder Theorem based schemes. Rigorous benchmark results demonstrate that the present invention can effectively mitigate all the limitations of the Asmuth-Bloom secret sharing scheme, allowing it to outperform Shamir's PSS in equivalent application contexts, as well as to offer a higher level of data security.

In addition, when the enhanced Asmuth-Bloom secret sharing scheme is applied in conjunction with Reed-Solomon error-correcting codes and/or cryptography, the overall scheme significantly outperforms existing preferred schemes such as Krawczyk's CSS scheme, and thus provides a core building block for next-generation secure, reliable and high-performance Cloud data storage infrastructures.

DETAILED DESCRIPTION

As discussed above, a major performance bottle-neck for the traditional Asmuth-Bloom secret sharing scheme is the generation of valid sequence of divisors, which accounts for more than half of the time and computational resources taken by the overall secret sharing process.

Figure 1:
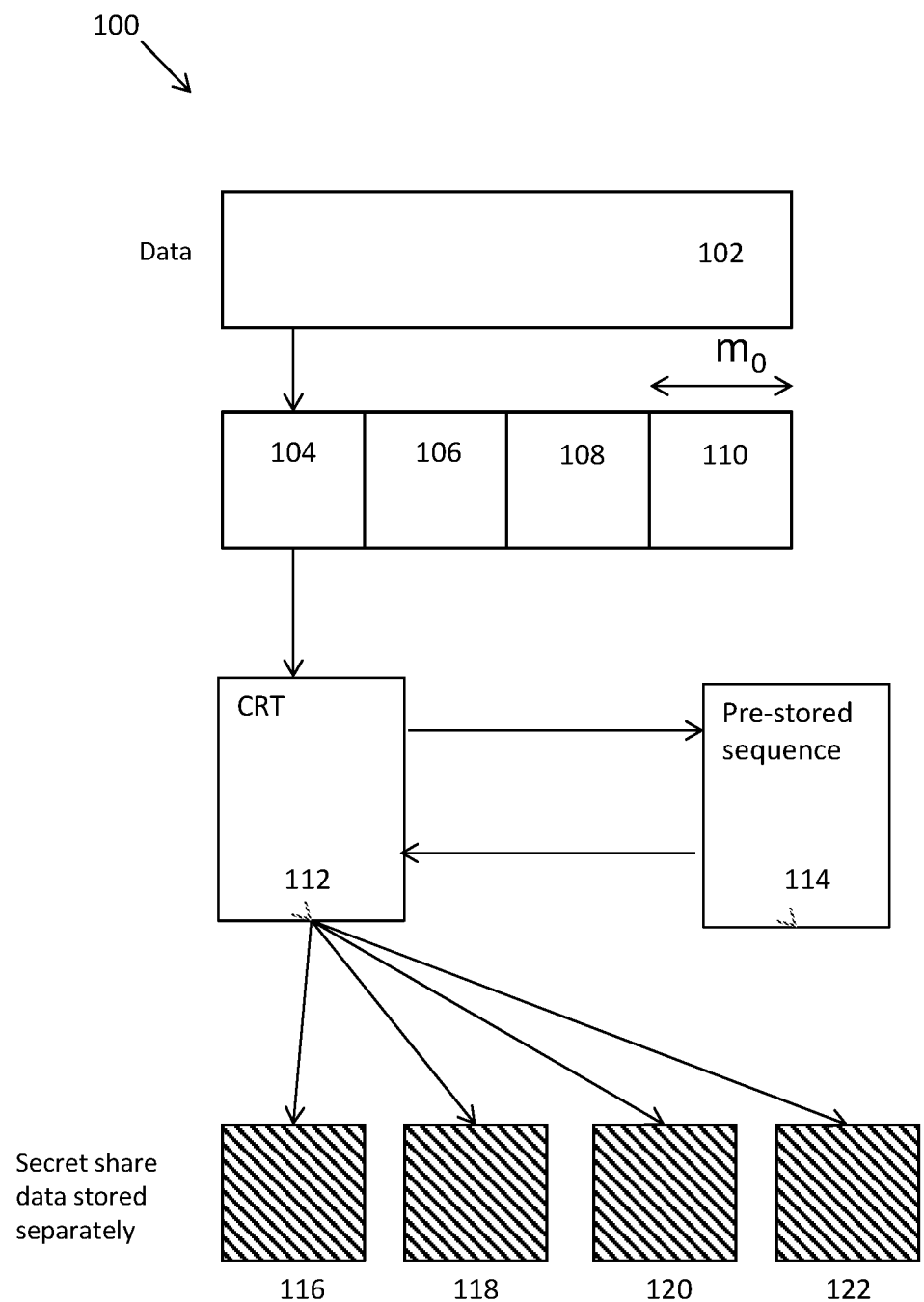
FIG. 1 is a block diagram illustrating a system for storing data as secret shares in memory.

As illustrated in FIG. 1, the scheme for storing data as secret shares in memory includes data 102, data blocks 104 to 110, a Chinese Remainder Theorem module 112, a sequence module 114 and resultant encrypted data blocks 116 to 122.

In operation, the data 102 is input or received to be stored securely and robustly in memory. The data is split into one or more data blocks each having length smaller than a set value $m_0$ (described below). The CRT module 112 generates secret shares 116 to 122 by using a Chinese Remainder Theorem secret sharing scheme. The CRT module uses a random selection of n pre-stored sequence values to generate a set of n Chinese Remainder Theorem congruence pairs. The pre-stored sequence is stored in the sequence module 114. The pre-stored sequence may be one or more Mignotte sequences or, more preferably one or more Asmuth-Bloom sequences or, more preferably, a Fan sequence.

A Mignotte sequence is a special sequence of strictly increasing, positive, and pair-wise coprime integers, such that the product of the smallest t of them is greater than the product of the (t−1) biggest ones.

Consider a number n and threshold t where n and t are integers and $2 \leq t \leq n$. A (t, n)-Mignotte sequence is a strictly increasing sequence of positive integers:

$m_1 < \ldots < m_n$ with greatest common divisor of any two members being 1, which in shorthand is written as $(m_i, m_j) = 1$. i.e. $m_i$ and $m_j$ are pairwise co-prime.

More particularly, for a Mignotte sequence $(m_i, m_j) = 1$ for all $1 \leq i < j \leq n$ such that $$\prod_{i=n-t+2}^{n} m_i < S < \prod_{i=1}^{t} m_i$$

where S is a secret value within the "authorized range" between the lower and upper bounds.

In other words, the secret is greater than the product of the largest t−1 members of the sequence and smaller than the product of the t smallest members of the sequence.

For simplicity of an example, consider a secret that is one word "Payfont". This can be encoded in ASCII as follows:

| 01010000 | 01100001 | 01111001 | 01100110 | 01101111 | 01101110 | 01110100 |
|---|---|---|---|---|---|---|
| 'p' | 'a' | 'y' | 'f' | 'o' | 'n' | 't' |

Because the Chinese Remainder Theorem only applies to integer values rather than texts, we take the 7 bytes above as an integer value in binary format, which is equivalent to the decimal value $(22,625,172,174,368,372)_{10}$.

Next, consider an access structure. Suppose that a company has 7 independent data stores and would like to set the threshold to 4, i.e. n=7 and t=4, the secret value shall be split into 7 shares while any 4 of them are needed to recover the secret.

In this case, we need to find a (4, 7)-Mignotte sequence which has an authorized range that fits the secret value 22,625,172,174,368,372.

Unfortunately, there is no easy way of finding such a sequence. In practice, we have to try out all possible combinations of prime numbers (as they are strictly increasing, positive, and pair-wise coprime), starting from 2, 3, 5, 7, 11, 13, 17 . . . . After some time (depending on how fast the computer is), we will eventually find a valid set of prime numbers, such as:

$m_1 = 11,927$
$m_2 = 12,109$
$m_3 = 12,421$
$m_4 = 13,411$
$m_5 = 13,967$ $m_6=14,057$ $m_7=14,633$

∴ $m_5*m_6*m_7=13,967*14,057*14,633=2,872,957,163,327$ and $m_1*m_2*m_3*m_4=11,927*12,109*12,421*13,411=24,057,872,711,999,333$ ∴ $m_5*m_6*m_7<S<m_1*m_2*m_3*m_4$, i.e. the authorized range is met.

(Note that the Mignotte sequence is not unique, and there can be many other possible sequences in this case.)

Then, we use this Mignotte sequence to construct a system of congruences:

$$\begin{cases} S \equiv 6890 \mod 11927 \\ S \equiv 2718 \mod 12109 \\ S \equiv 7799 \mod 12421 \\ S \equiv 10262 \mod 13411 \\ S \equiv 12163 \mod 13967 \\ S \equiv 8617 \mod 14057 \\ S \equiv 7379 \mod 14633 \end{cases}$$

Accordingly, the 7 secret shares are:

[6890; 11927]
[2718; 12109]
[7799; 12421]
[10262; 13411]
[12163; 13967]
[8167; 14057]
[7379; 14633]

To recover the original secret, we can feed any 4 of the 7 shares into the Chinese Remainder Theorem and Extended Euclidean Algorithm, as described above:

$S=\Sigma_{i=1}^{t}(S_i*N_i*M_i) \mod M$

The calculation process is quite lengthy but is well known and need not be described in detail here.

The above system is improved by pre-storing at least one suitable Mignotte sequence in memory 114. For example, a Mignotte sequence can be stored for the access structure (4, 7). Dependent on the actual values selected, an authorized range can be defined. To put this another way, for a given required authorized range and a given access structure, a set of Mignotte sequence values can be pre-calculated and pre-stored for use in encrypting any secret within that range.

Any secret can be encoded in any suitable coding and converted to a binary value. The value must fall within the authorized range or must be padded out to fit within the authorized range or must be split up into portions each falling within the authorized range (with the most significant portion being padded out to fit within the authorized range).

Note, for example, that any 7-character text can be stored as ASCII text of 8 bits per character within an authorised range of 11,294,321,418,444,832 (equivalent to "_ _ _ _ _ _ _") to 34,474,613,618,145,914 (equivalent to ZZZZZZZ). In this example, the characters are constrained by (i) not using all the available bits per character (in this case using only 7 bits per character) and (ii) not permitting characters lower in the coding set (e.g. lower than the character"). These factors separately and together constrain the range of the secret and each facilitates CRT encoding.

Unicode and the ISO/IEC 10646 Universal Character Set are other examples of coding schemes. They have a much wider array of characters (more bits per character) but it is not necessary to permit the full character set to be encoded. Indeed, as above, it is preferable to constrain the available character set as a subset of the full character set. If one defines the number of characters in a block to be encoded and if one sets a constraint on the range of each character (or at least the range of the first character in each block), this limits the range of the secret to be encoded and facilitates CRT encoding by enabling a predetermined set of Mignotte sequence values to be calculated and stored for such characters for a given access sequence.

A particular challenge presented by a threshold secret sharing scheme is its (t, n) access structure, which requires a Mignotte sequence to meet the following condition:

$$\prod_{i=n-t+2}^{n} m_i < S < \prod_{i=1}^{t} m_i$$

In other words, a Mignotte sequence that is valid for one (t, n) access structure may not be valid for another (t', n') access structure. On the other hand, it would be preferable for a cloud data storage infrastructure to have t and n values that are dynamic (i.e. selectable), so as to afford various security and reliability configurations demanded by different application scenarios.

To this end, further sets of Mignotte sequence values can be pre-calculated and pre-stored for alternative access sequences (t, n), such as (3, 7), (5, 7), (3, 8), (4, 8), (127, 255), (191, 255) etc. which are then available for selection for encryption at a later time. These further Mignotte sequences can be stored in memory 114. Sequences may be stored to accommodate a selection of values of n from 3 to 255 and a selection of values of t from 2 to n, for example a selection of, say, 4 to 20 values of n in the range 3 to 255 and a selection of, say, 2 to 8 values of t where t<n. The range for t may be, for example 0.25n to 0.80n.

The user can thus select an access structure and create CRT secret shares for the selected access structure without having to perform the laborious and slow process of calculating the Mignotte sequences for the secret and the access structure.

Moreover, because the Mignotte sequences are pre-stored, they can be referred to by index, which is a more compact way of storing the resultant secret shares than having to store the actual divisors. Each secret share of a given secret may include (i) the access structure, (ii) the index of the sequence for that access structure and (iii) the remainder.

Pre-calculating valid Mignotte sequences for every possible (t, n) access structure that may arise in an application scenario may require a very large memory. E.g. the total number of Mignotte sequences to be pre-calculated is of the order of $2^n$, specifically:

$$\sum_{1 \leq t \leq n} \binom{n}{t} = 2^n$$

For example, suppose that an application needs to split highly confidential files into 255 secret shares, i.e. n=255. According to the analysis above, if the system is to be sufficiently flexible to allow any access structure (t, n) where 1<t≤n then $2^{255}$ Mignotte sequences would have to be pre-calculated. In addition, suppose that each Mignotte sequence comprises 255 integer values, each of 32 bits, then the total size of the lookup table would be:

$2^{255}*255*32$ bits $\approx 2^{225}$ Tera Bytes

Obviously, it is impossible to store such an enormous lookup table in memory.

Asmuth-Bloom

The Asmuth-Bloom secret sharing scheme builds on top of the mathematical foundation of the Mignotte sequence and introduces a modification so as to obtain a usability benefit. Specifically, instead of using a series of n pairwise coprime integers $m_1, m_2, \ldots, m_n$ and requiring that $m_0 * \Sigma_{i=n-t+2}^{n} m_i < S < \Pi_{i=1}^{t} m_i$, it actually uses a series of n+1 pairwise coprime integers $m_0, m_1, m_2, \ldots, m_n$.

Let $2 \leq t \leq n$ be integers. A (t, n)-Asmuth-Bloom sequence is a strictly increasing sequence of positive integers:

$$m_0 < m_1 < \ldots < m_n$$

with $(m_i, m_j)=1$ for all $0 \leq i < j \leq n$, such that $$m_0 * \prod_{i=n-t+2}^{n} m_i < \prod_{i=1}^{t} m_i$$

(In words: the product of the base number and the top t−1 numbers is less than the product of the bottom t numbers).

The key difference between an Asmuth-Bloom sequence and a Mignotte sequence lies in that Asmuth-Bloom introduces an unconstrained value $m_0$ and allows any secret value to be chosen conveniently from the quotient ring $\mathbb{Z}/m_0\mathbb{Z}$, as long as $m_0 * \Pi_{i=n-t+2}^{n} m_i < S + \alpha * m_0 < \Pi_{i=1}^{t} m_i$, where $\alpha$ is a random integer.

For the same application scenario described above, i.e. S=22,625,172,174,368,372 and the demanded access structure is (4, 7), a valid Asmuth-Bloom sequence can be found through the following steps:

Firstly, choose an arbitrary prime number $m_0>S$, e.g. $m_0$=22,625,172,174,368,509.

Secondly, start enumerating prime numbers that are greater than $m_0$, and try to assign them to $m_i$ until the condition $m_0 * \Pi_{i=n-t+2}^{n} m_i < \Pi_{i=1}^{t} m_i$ is met. For instance, we may find the following prime numbers:

$m_1$=22,625,172,174,369,047
$m_2$=22,625,172,174,369,101
$m_3$=22,625,172,174,369,119
$m_4$=22,625,172,174,369,133
$m_5$=22,625,172,174,369,143
$m_6$=22,625,172,174,369,179
$m_7$=22,625,172,174,369,197

(As for the Mignotte sequence, an Asmuth-Bloom sequence is also not unique.)

Thirdly, choose a random integer $\alpha$ that will place $S+\alpha*m_0$ within the authorized range. E.g. $\alpha$=511,898,415, 919,864,114,764,444,274,274,941, and then calculate $S'=S+\alpha*m_0$=11,581,789,795,973,427,356,581,860,363,966,772, 358,932,692,601,341. Note that S' is greater than $m_5*m_6*m_7$, but smaller than $m_1*m_2*m_3*m_4$, so the a value chosen is valid.

The range constraint for an Asmuth-Bloom sequence is:

$$m_0 * \prod_{i=n-t+2}^{n} m_i < S + \alpha * m_0 < \prod_{i=1}^{t} m_i$$

which, in words, means the sum of the secret value and the product of the random Integer and the base number is greater than the product of the highest t−1 members but less than the product of the lowest t members (above the base member).

Then calculate $S'=S+\alpha*m_0$=22,625,172,174,368,372+511,898,415, 919,864,114,764,444,274,274,94122,625,172, 174,368,509=11,581,789,795,973,427,356,581, 860,363,966,772,358,932,692,601,341.

Fourthly, we use S' and the Asmuth-Bloom sequence to construct a system of congruences:

$$\begin{cases} S' \equiv 22{,}625{,}172{,}174{,}355{,}460 \bmod 22{,}625{,}172{,}174{,}369{,}047 \\ S' \equiv 22{,}625{,}172{,}174{,}354{,}164 \bmod 22{,}625{,}172{,}174{,}369{,}101 \\ S' \equiv 22{,}625{,}172{,}174{,}353{,}732 \bmod 22{,}625{,}172{,}174{,}369{,}119 \\ S' \equiv 22{,}625{,}172{,}174{,}353{,}396 \bmod 22{,}625{,}172{,}174{,}369{,}133 \\ S' \equiv 22{,}625{,}172{,}174{,}353{,}156 \bmod 22{,}625{,}172{,}174{,}369{,}143 \\ S' \equiv 22{,}625{,}172{,}174{,}353{,}292 \bmod 22{,}625{,}172{,}174{,}369{,}179 \\ S' \equiv 22{,}625{,}172{,}174{,}351{,}860 \bmod 22{,}625{,}172{,}174{,}369{,}197 \end{cases}$$

Accordingly, the 7 secret shares are:
[22,625,172,174,355,460; 22,625,172,174,369,047]
[22,625,172,174,354,164; 22,625,172,174,369,101]
[22,625,172,174,353,732; 22,625,172,174,369,119]
[22,625,172,174,353,396; 22,625,172,174,369,133]
[22,625,172,174,353,156; 22625,172,174,369,1431]
[22,625,172,174,353,292; 22,625,172,174,369,179]
[22,625,172,174,351,860; 22,625,172,174,369,197]

Figure 7:
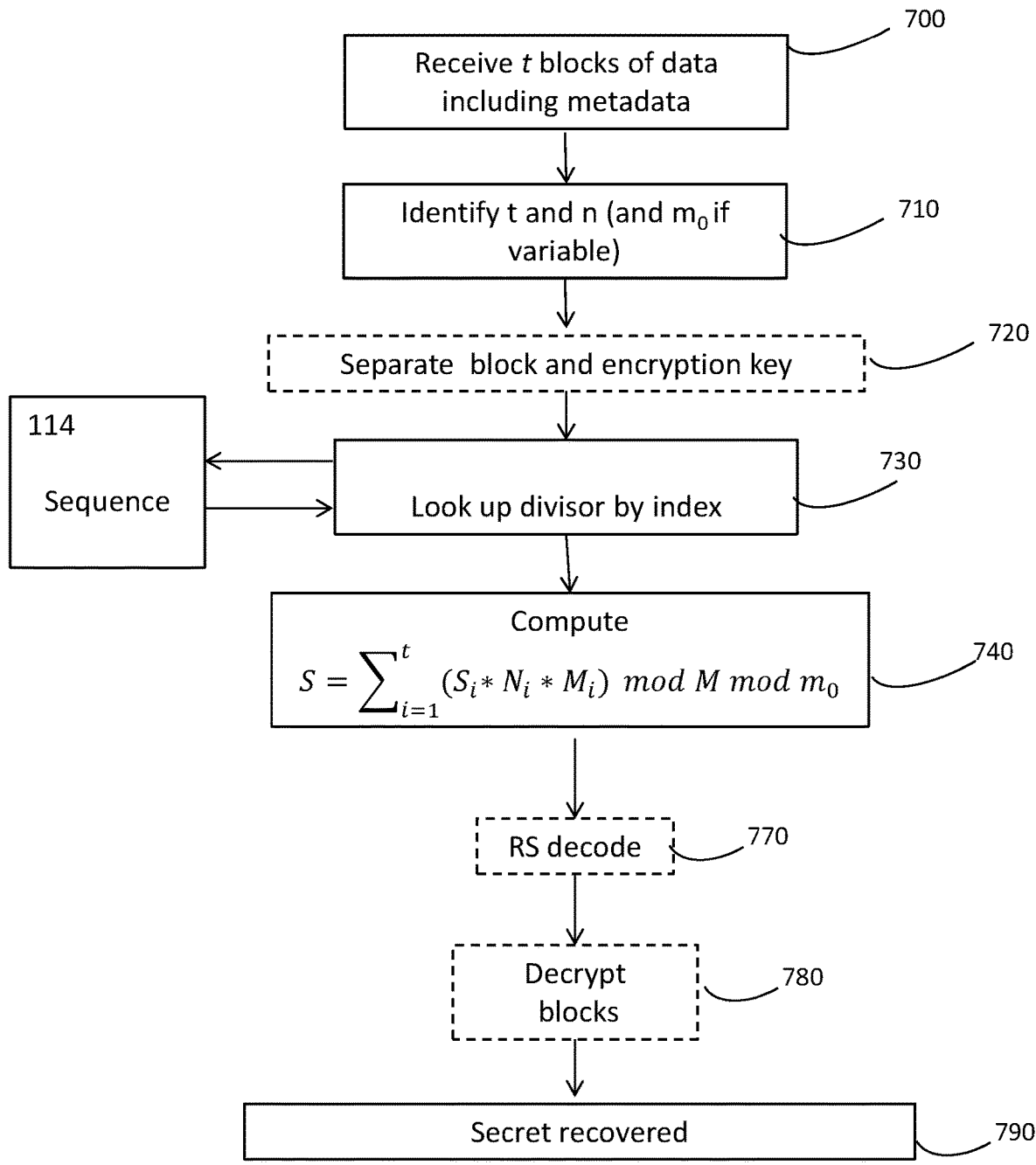
FIG. 7 is a flowchart illustrating the decoding and recovery process corresponding to the processes of FIGS. 4 and 6.

To decode and recover the secret, the process of FIG. 7 is used. In step 700 a number of secret shares are recovered from storage. They may be recovered from different cloud storage systems or locations or from a mix of cloud stores and local stores (local to the system 100, 200 or 500 or stored on fixed media such as solid state storage, CD-ROM or the like). At least t such shares must be recovered to begin the process.

Each share is (or includes) a congruence pair that comprises an index and a remainder. Note that the index is an index for a divisor stored in table 114 (of FIG. 1) or 208 (of FIG. 2) or 516 (of FIG. 5). This is a compact way of storing a congruence pair, made possible by the manner in which the share was generated (as described above).

In one embodiment, metadata stored (unencrypted) with each share identifies the (n, t) access structure. In another embodiment, n and t are stored locally in the system 100, 200 or 500 for use when the data is to be recovered. In other words, for a given set of data, identified by a given set of identifiers or a given set of storage addresses, a look-up operation is performed in the system to identify n and t for that set of data. For a second, different set of data, a second pair of values n and t are retrieved from the look-up table. In this embodiment, the look-up table is under the secure custody of the system operator, but note that knowledge of n and t is of scant value to recover any secret.

Steps 700 and 710 can be performed in reverse order. If $m_0$ is a variable parameter in the system, this is recovered in the same way as n and t. For example, there may be a set of possible values for $m_0$ and the index for the value previously used for the data set may be stored (as metadata with the shares or locally) as for n and t. Alternatively, $m_0$ may be an open value, in which case it is preferably stored locally.

Figure 6:
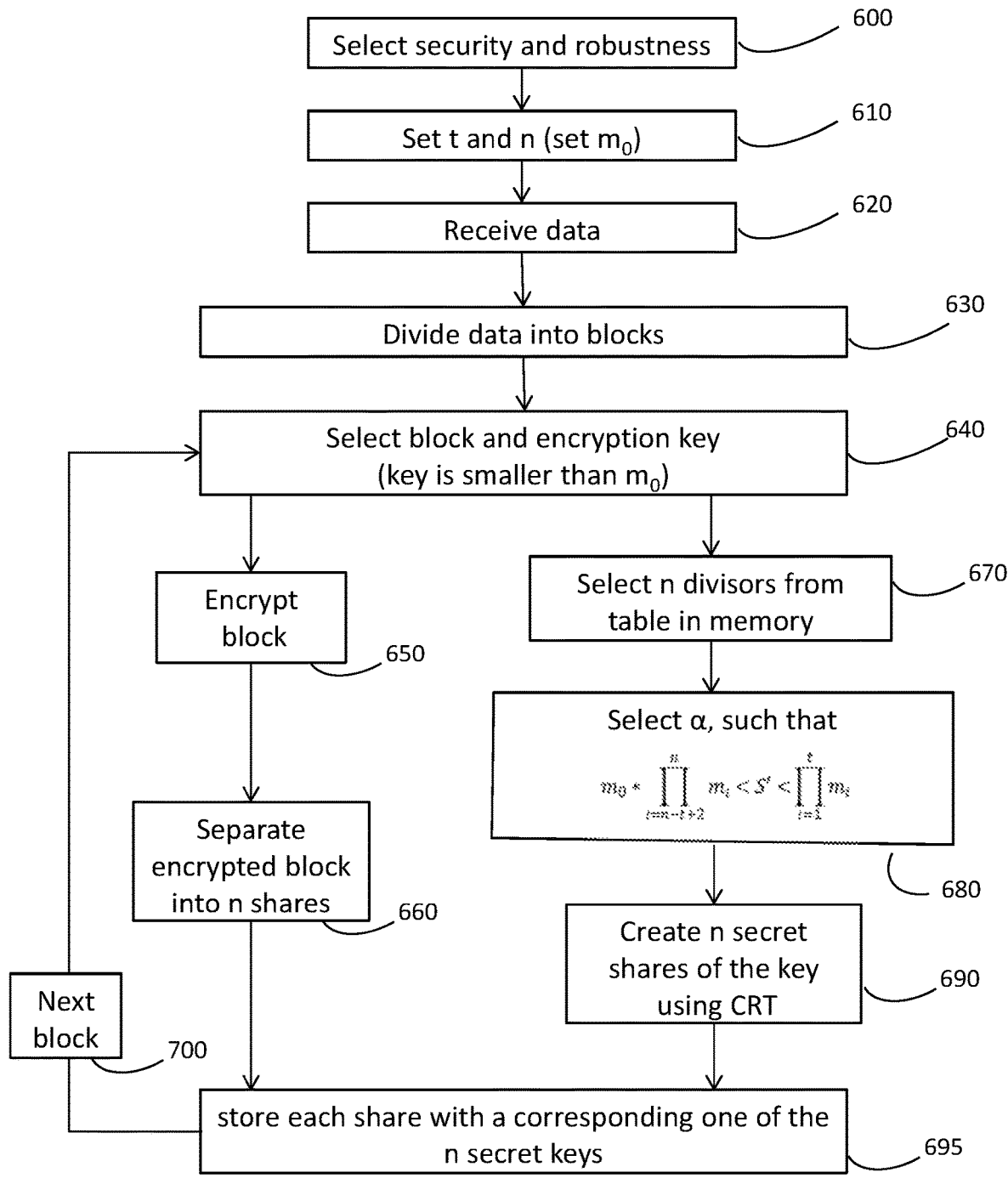
FIG. 6 is a flowchart illustrating an operation of the system of FIG. 5.

If the process of FIG. 6 was used to encode the data, step 720 operates to separate the share of the key from the fragment of the crypto text. Otherwise, if the process of FIG. 4 was used, step 720 is unnecessary.

In step 730 the index is used to look up the divisor in the look-up table 114 (or 208 or 516). It may be an index in a single sequence (e.g. a Fan sequence) or it may identify a specific Asmuth-Bloom sequence and a divisor in that sequence. This is performed for each of the t shares. Each has a different divisor in the same sequence.

In step 740, a modular multiplicative inverse computation is performed to recover the secret from the shares.

Figure 4:
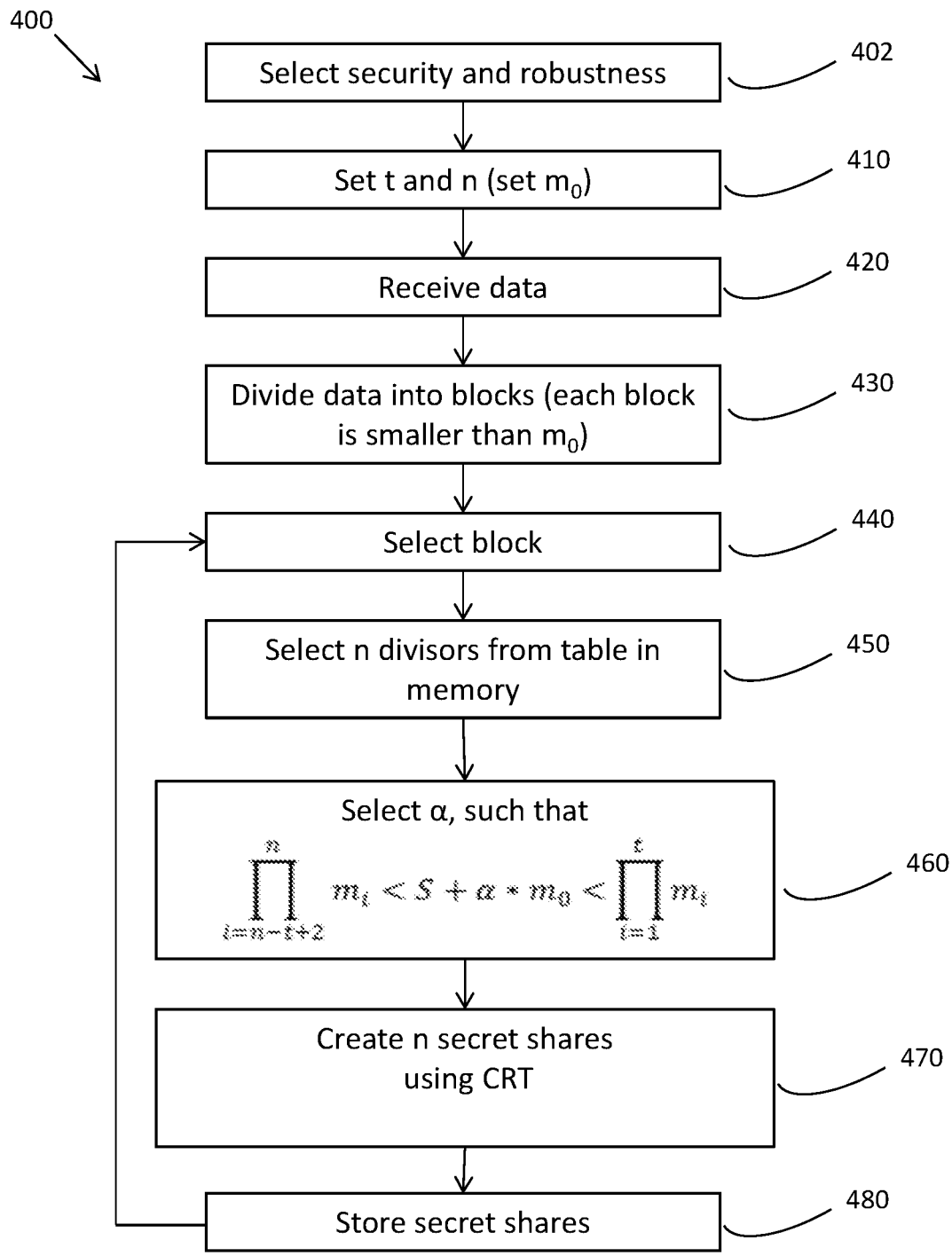
FIG. 4 is a flowchart illustrating an example of operation of the system of FIG. 2.

In the case of the FIG. 4 process, the secret block is recovered (step 790) and the process can be repeated for another set of t shares to recover the next block (if the secret occupies plural blocks) until all blocks of the secret are recovered.

In the case of the FIG. 6 process, t Reed-Solomon encoded blocks of crypto text are decoded to give a single block of crypto text (step 770) and this is decrypted using the recovered key (step 780). Alternatively, if in the encryption process, RS coding was performed before encryption, then steps 770 and 780 are performed in reverse order.

The searching for an Asmuth-Bloom sequence typically takes less time than a Mignotte sequence, as we know we are looking for prime numbers that are slightly greater than $m_0$. However, the searching may still account for more than half of the overall time for the secret sharing process.

An Asmuth-Bloom sequence is regarded perfectly secure, since fewer than t shares do not reveal any information about the secret S. The mathematical proof for this is omitted here.

It is comparatively easier to reuse a Asmuth-Bloom sequence than a Mignotte sequence, because the authorized range of the former is defined by an unconstrained value $m_0$, rather than a floating range ($\Pi_{i=n-t+2}^{n} m_i$, $\Pi_{i=1}^{t} m_i$).

An Asmuth-Bloom sequence does not necessarily support flexible access structures. For example, given $m_0$=22,625,172,174,368,509,
$m_1$=22,625,172,174,368,651
$m_2$=22,625,172,174,368,669
$m_3$=22,625,172,174,368,677
$m_4$=22,625,172,174,368,693
$m_5$=22,625,172,174,368,707
$m_6$=22,625,172,174,368,741
$m_7$=22,625,172,174,368,761 makes a valid Asmuth-Bloom sequence for the access structure (2, 7), but it is not valid for access structures (3, 7) or (4, 7). This is especially a problem for a dynamic secret sharing system, which aims to support a wide range of t and n values and to apply them flexibly.

Different sets of Asmuth-Bloom sequences may be pre-calculated to suit a range of different access structures (as described above) that may arise in an application scenario, and these are stored in different look-up tables (a different one for each access structure). In this way it is not necessary to search for Asmuth-Bloom sequences on the fly, and thus considerable amount of time and computational resources can be saved.

This approach is an improvement on calculation of Asmuth-Bloom sequences in real time, not just because it is quicker, but more particularly because the resultant congruence pairs can be readily compressed to the index of the divisor (i.e. the table and the value in the table) and the divisor.

The approach described so far has two drawbacks. Firstly, the trade-off for reduced time complexity is usually increased space complexity. That is to say, the size of the collection of look-up tables may get too big to be managed efficiently, if the total number of possible access structures is very large. Or (to put this the other way around) it may be necessary to limit the range of access structures made available and there is a need to offer a wide range of access structures for a wide range of applications.

Secondly, depending on memory constraints, for each access structure there may be a limited number of Asmuth-Bloom sequences pre-prepared, so the system becomes predictable to hackers, and thus reduces the effort required by brute-force attack.

It would be advantageous to be able to accommodate a wide range of access structures with a wide range of selectable Asmuth-Bloom sequence values for each access structure without any corresponding increase in memory requirement and without significantly increasing computational load.

To this end, a novel sequence and use thereof is now described, which will be referred to as a "Fan" sequence (after the first inventor).

A Fan sequence has the following properties:
1) it comprises N strictly increasing, positive, and pair-wise coprime integers, with N being configurable;
2) let 1<t≤n≤N, a sub-sequence that consists of randomly selected n integers from a Fan sequence will make a valid Asmuth-Bloom sequence for any access structures (t, n).

Considering the application scenario previously described, where S=22,625,172,174,368,372 and the demanded access structure is (4, 7). The problem can be solved via the following steps.

Firstly, because the secret value is 7 bytes (i.e. 56 bits) long, we pick an arbitrary prime number $m_0$ of 57 bits, e.g.

$$m_0 = (101001111000001101111000000101111010111001001100110000011)_2$$

$$= (94,301,745,854,585,219)_{10}$$

Note, $m_0$ is pre-selected for the system based on a scale (i.e. block size) for the system instead of a particular secret value, because most applications tend to deal with data packets of consistent sizes. In this example, the secret "Payfont" is 7-bytes long but the length of the secret (or the typical length of the secret) may be longer or shorter. In the example it is assumed that 7 bytes may be a popular size for sensitive data in this application, and thus a 57-bit $m_0$ is chosen to ensure that any 7-byte data will be processed efficiently using the Fan sequence. The selected block size to be handled (4 bytes, 7 bytes, 8 bytes or some other value, M) and thus the size of $m_0$ will have to be set for the proposed application. Moreover, it will not be a problem for the Fan sequence to process data packets of any other sizes, but they would need to be chopped (or padded) into M-byte chunks in advance, and then be processed over multiple M-byte iterations.

Secondly, we choose a proper N value so that 1<t≤n≤N. Say, N=20, a Fan sequence of 20 elements is generated, e.g.

$m_1$=104,608,886,616,215,223
$m_2$=104,608,886,616,215,224
$m_3$=104,608,886,616,215,225
$m_4$=104,608,886,616,215,227
$m_5$=104,608,886,616,215,231
$m_6$=104,608,886,616,215,233
$m_7$=104,608,886,616,215,237
$m_8$=104,608,886,616,215,239
$m_9$=104,608,886,616,215,243
$m_{10}$=104,608,886,616,215,249
$m_{11}$=104,608,886,616,215,251
$m_{12}$=104,608,886,616,215,257
$m_{13}$=104,608,886,616,215,263
$m_{14}$=104,608,886,616,215,269
$m_{15}$=104,608,886,616,215,273
$m_{16}$=104,608,886,616,215,279

$m_{17}$=104,608,886,616,215,281
$m_{18}$=104,608,886,616,215,287
$m_{19}$=104,608,886,616,215,291
$m_{20}$=104,608,886,616,215,293

Note that the integers in a Fan sequence are collectively pair-wise coprime, but it does not mean that each single integer has to be prime by itself. Note also that a Fan sequence is not unique, so it is possible to give many different sequences, each containing 20 numbers.

There is no effective upper bound for N and it is encouraged to employ a N that is as large as possible. As discussed previously, what we need to use is a selection of 7 random integers from the Fan sequence, and without doubt, a larger N would offer more possible combinations in this case. A typical maximum value of N is 255.

Thirdly, draw 7 random elements from the Fan sequence, e.g.:
$m_2$=104,608,886,616,215,224
$m_6$=104,608,886,616,215,233
$m_9$=104,608,886,616,215,243
$m_{13}$=104,608,886,616,215,263
$m_{16}$=104,608,886,616,215,279
$m_{18}$=104,608,886,616,215,287
$m_{20}$=104,608,886,616,215,293

This is guaranteed to be a valid Asmuth-Bloom sequence for the (4, 7) access structure.

The rest of the secret sharing process is as described for the Asmuth-Bloom process:
  choose a random integer $\alpha$ such that $S'=S+\alpha*m_0$ lies within the authorised range (note that $\alpha$ is chosen subsequent to selecting the random set of values, because the range depends on the values selected);
  construct a system of congruences using S' and the Asmuth-Bloom sequence that was extracted from the Fan sequence.

Because the divisors are chosen from a Fan sequence, their values can be looked up according to their index numbers. Therefore, it is not necessary to write them down again in the secret shares.

According to preferred aspect of the present invention, $m_0$ can be selected to further enhance the space efficiency and throughput of the traditional Asmuth-Bloom secret sharing scheme. Specifically, a "sweet spot" is selected for the size of the quotient ring $\mathbb{Z}/m_0\mathbb{Z}$ for a particular application context:
  when most of the input values tend to be small, a smaller $m_0$ would significantly reduce the amount of memory to be used by the secret sharing scheme, as well as avoid large numbers of big Integer arithmetic operations;
  when most of the input values are large, a larger $m_0$ would facilitate batch processing, and thus result in fewer loops and a better throughput.

The $m_0$ value is selectable as a function of block size (smaller for a smaller block size and larger for a larger block size) so that it strikes a balance among the memory consumption, processing performance, and optimised throughput.

If we allow an application to choose from a flexible value for the base divisor, $m_0$, this makes a hacker's job slightly more difficult. It is one more variable to have to guess. There may be a set of selectable values for the base divisor, accommodating a range of sizes of secret. The base divisor can be identified in terms of its index within the set of selectable values. This index can be stored as metadata with the shares (in clear, unencrypted). Alternatively, the base value (or its index) can be stored locally.

The sweet-spot for $m_0$ is typically static for a single application. After the $m_0$ value has been determined, a Fan sequence of $m_1$ to $m_n$ (greater than $m_0$) can be pre-calculated using the method described in the previous section and further described now with reference to FIG. 2.

In this manner, a highly compact Asmuth-Bloom sequence lookup table can be built in memory. Consider the same example application scenario, in which n=255 and the size of an integer is 32 bits, the minimum size of a Fan sequence based lookup table is:

255*32 bits≈1 KiloByte

Hence, the time complexity of the overall secret sharing scheme is significantly reduced with a negligible increase in the space complexity.

Furthermore, a larger Fan sequence can be pre-calculated, of which any random sub-sequence can be selected as the actual lookup table for an application. This affords stronger dynamism (variability) and unpredictability, and thus a much higher level of security.

Figure 2:
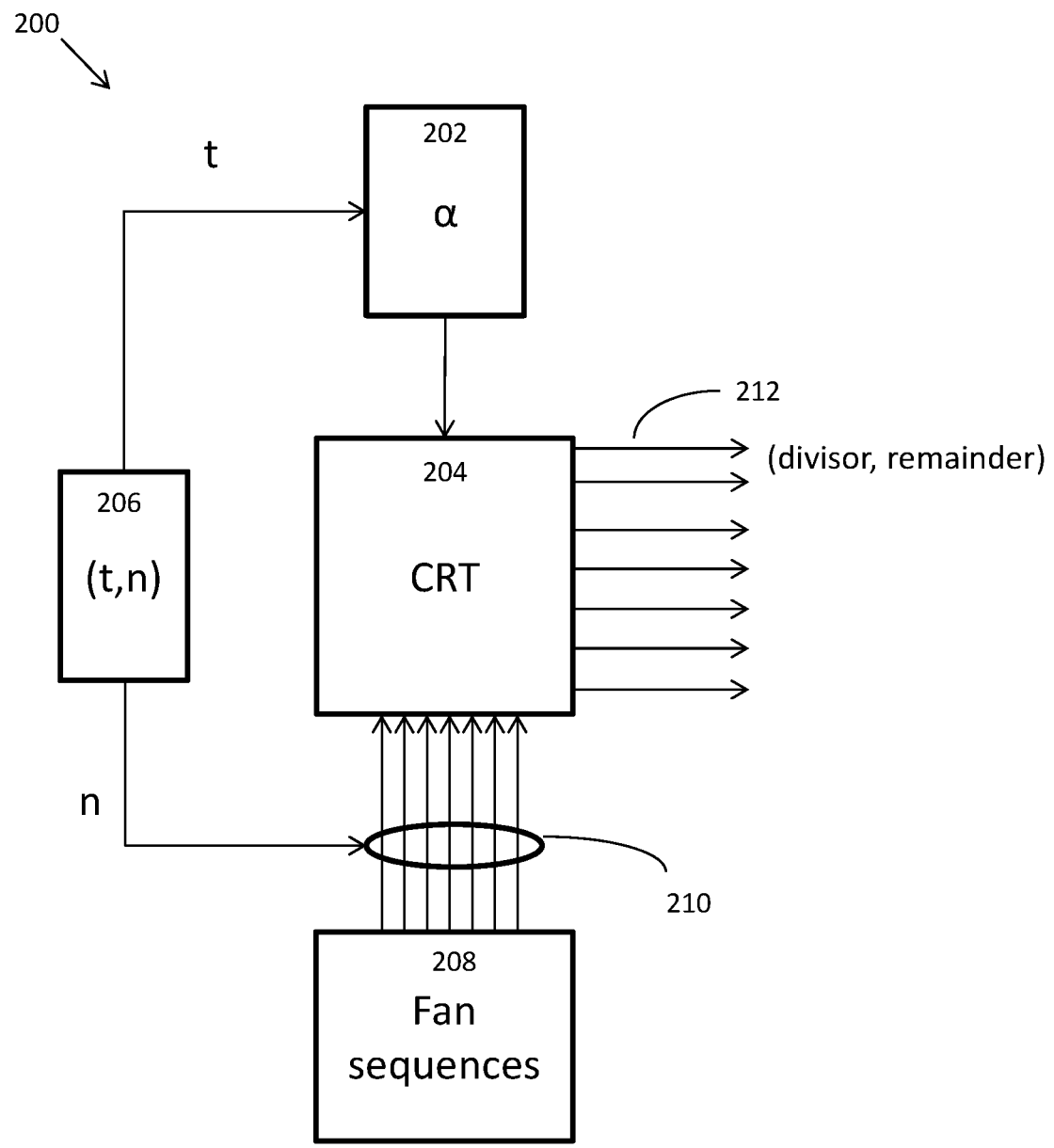
FIG. 2 is a block diagram of a particularly preferred system.

FIG. 2 shows a system 200 comprising a selector input 206, a random number generator 202, a CRT calculator 204 and a memory 208 storing a Fan sequence.

In operation, an administrator (acting on behalf of a company, bank, health provider etc.) sets values for t and n. These may be indirectly selected based on robustness, security criteria and cost of service or may be set directly. Higher values of n represent increased cost (more shares to be stored) but higher security. Higher values of t represent increased security (more shares must be retrieved) but lower robustness against loss of shares. The ability to select values for t and n represents increased flexibility in the provision of a data storage service for different types of client and different storage purposes, but also increased complexity (for reasons set out above).

The value n directly determines the number of values 210 to be selected from the table of Fan sequences and the number of congruence pairs (secret shares) 212 generated. The particular numbers selected are preferably random from among a complete stored set of N values.

The value for t determines the range within which the random number generator 202 generates a random number a for the selected Fan sequence values, $\alpha$ is set so that $S+\alpha*m_0$ lies within the authorised range for the randomly selected set of n Fan sequence values and the set value for t. The range for alpha only changes when a new sequence is drawn. In practice, each calculation of $\alpha$ is a very light operation. Alternatively (for even greater efficiency) it is not expected that the sequences will change frequently and it is possible to set $\alpha$ within a range that is narrower than the full range available. $\alpha$ is essentially a random number, which is preferably different each time so as to serve as an obfuscator. Narrowing down to a valid sub-range of $\alpha$ will help reduce the effort for re-estimating the range repeatedly.

In this manner, both the performance and throughput of the traditional Asmuth-Bloom secret sharing scheme are significantly improved in a memory-efficient manner.

Figure 3:
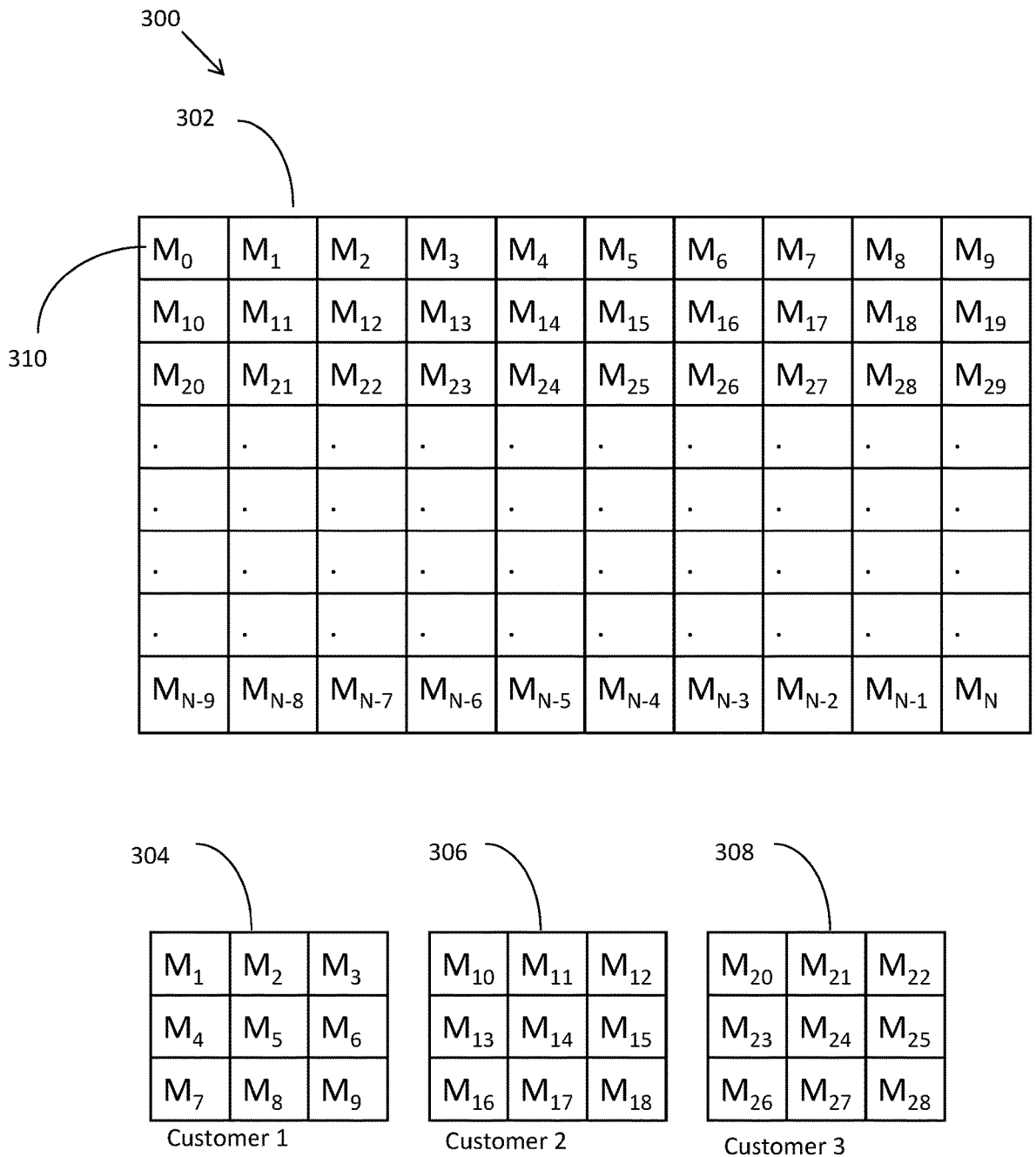
FIG. 3 shows a "Fan" sequence.

A further advantage of a Fan sequence is that (by virtue of the second criterion described above) a subset of a Fan sequence is also a Fan sequence. This means that once a Fan sequence has been found (which can be done by trial-and-error) for a given value of $m_0$ different subsets of the sequence can be provided to different users or customers of the system. This is illustrated in FIG. 3.

In this figure, the Fan sequence 302 has been found. These are Asmuth-Bloom values starting with $M_0$ (the base value 310) and increasing to $M_N$ for which there exist values of $\alpha$ such that the sum of secret S (up to a selected size) and the product of the random integer and the base number can satisfy the authorized range for any access structure (t, n) where 1<t≤n≤N. Any subset (e.g. subsets 304, 306 and 308) of this sequence is itself a Fan sequence. Accordingly, a system can be created in which subsets 304, 306 and 308 are allocated to different users (customers) and data of each users is fragmented with the sequence for that user and this is so regardless of the access structure used by the respective user.

Different users are allocated different subsets of the Fan sequence 302. Each user can select any n random values from his/her sequence to generate a set of n secret shares using any access structure (t, n) up to the number of values in the subset allocated to that user. No user knows what are the values allocated to other users. Indeed, shares of each user are stored as an index and remainder in which the index is an index in the subset of that user only. In other words, the index of one user has no meaning to another user.

Operation of the system of FIG. 2 is further described with reference to FIG. 4, which represents steps of a computer program stored in the system 200. The process starts in step 400 with user selection of a level of security and robustness. This selection determines values for t and n, which are set in step 410. At this point the value $m_0$ is already set. It is set at a size that is greater than the largest numerical value to be processed in a single block of data. It does not need to be vastly greater than the largest numerical value to be processed. If it is vastly larger, this adds to the processing complexity. It is sufficient that it is a fraction of one percent larger (and need be no more than a few percent larger). The system is ready to receive data.

Data is received (input) in step 420 according to a coding scheme (e.g. ASCII, Unicode etc). The system may limit the coding scheme to a subset of all the possible values that may be represented by the particular coding scheme, as described above. This has the effect of limiting the range within which the numerical equivalent of the data may lie. In step 430 the data is split into blocks, each block being smaller than $m_0$ (i.e. being just small enough to be incapable of storing data having a numerical value greater than $m_0$ given the coding scheme).

The first block to be processed is selected in step 440. The data is converted from its coding scheme (e.g. ASCII, Unicode, etc) to a numerical value (in decimal or binary).

In step 450, a set of divisors are selected, at random, from the memory 208. There are n such divisors in the set. Depending on the divisors selected, this will determine the authorized range for S'. The authorised range is as for a Mignotte sequence (or Asmuth-Bloom sequence), i.e. greater than the product of the largest t−1 divisors selected and smaller than the product of the t smallest divisors selected.

In step 460, an integer α is selected such that the numerical value of the data to be stores plus the multiple of the integer and $m_0$ lies within the authorized range.

In step 470, a set of n congruence pairs are generated according to the CRT principle. In step 480, these are stored. Each is preferably stored as an index number for the respective divisor and a remainder. The pairs are preferably stored on different storage media or in different places. E.g. at least t of the shares are preferably stored on different cloud storage entities. Some of the shares may be stored locally. Some may be stored in removable storage (e.g. physically on a disc or a solid state device).

The process returns to step 440 to process the next block. It repeats steps 440-480 until all the blocks have been processed. When completed, all the blocks are stored as n shares per block in which all the shares are of equal size. No share is distinguishable from any other share. To retrieve the secret, the system merely needs to record where it has saved the shares for each block (or, alternatively, it allocates an identifier for each share and retrieves the shares by their identifiers) and it retrieves at least t shares for a given block and recovers the share by applying the reverse CRT algorithm. It repeats this for each block and thus recovers the original data.

Preferably, when a share is stored, it is stored together with an identifier identifying the access structure used to generate that share. To recreate the secret, it is not necessary to know the value α used to generate the share, but the knowledge of the (t, n) access structure is used to recreate the secret.

RS-CRT Hybrid Scheme

In some unique application scenarios, the size of a secret file can be huge, and is totally beyond the capability of any perfectly secure secret sharing scheme. For example, in healthcare, a patient's private health record may contain hundreds of high definition MRI scan images, each of 512 by 512 resolution and a pixel depth of 16 bits. The size of such a health record can be a few terabytes, while the size of a secret share that was created using a perfectly secure secret sharing scheme has to be at least the same size as the original secret, i.e. a few terabytes. Without doubt, this will lead to a massive demand on computation, network and storage overheads, making the secure and reliable Cloud data infrastructure unviable.

To overcome such drawbacks, an alternative system is described with reference to FIG. 4.

Figure 5:
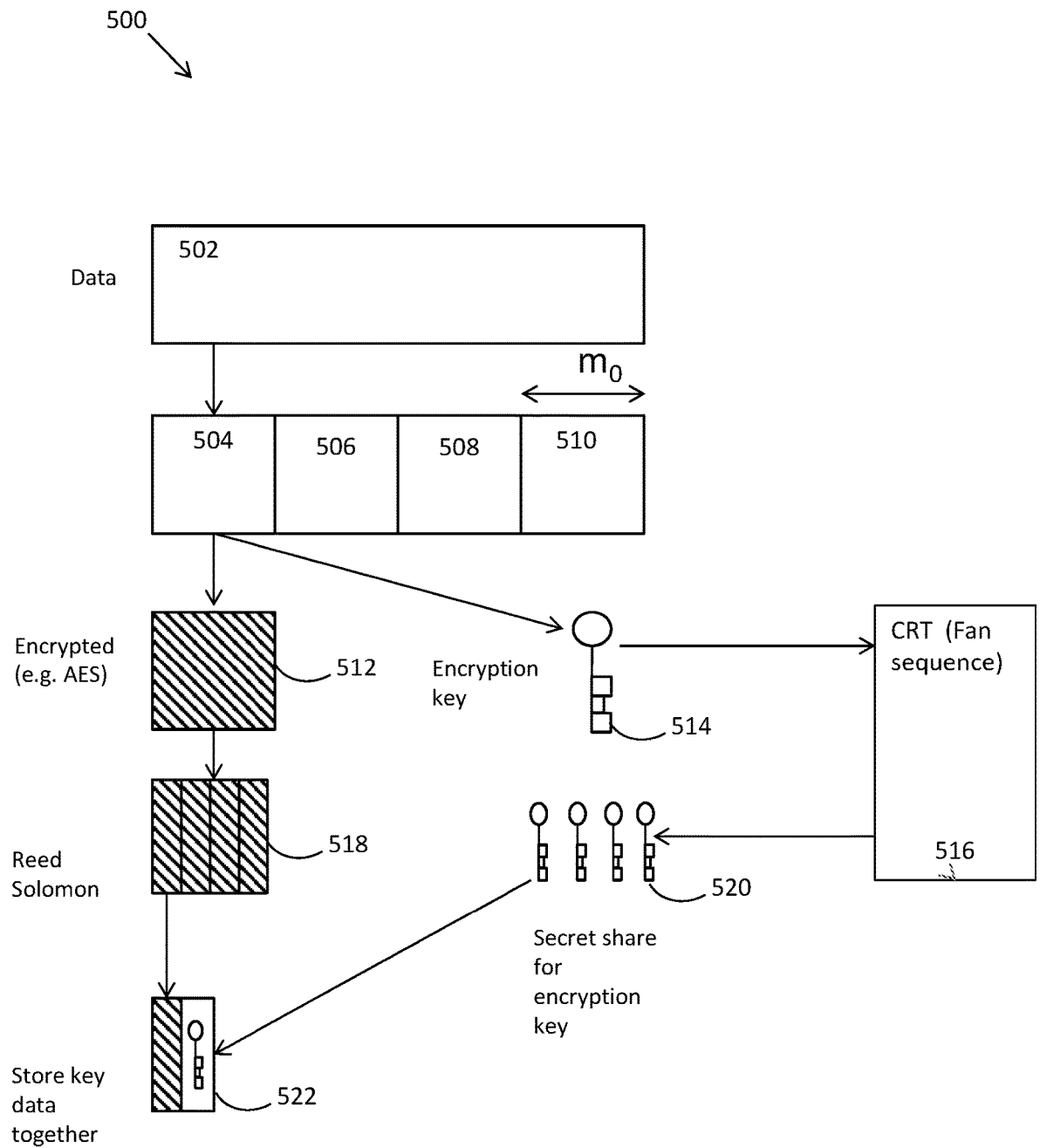
FIG. 5 is a block diagram illustrating an alternative system for storing data as secret shares in memory.

As illustrated in FIG. 5, the system for storing data as secret shares in memory includes data 502, data blocks 504 to 510, encrypted data block 512, encryption key 514, a CRT module 516, a plurality of encrypted data block shares 518, a plurality of CRT encryption keys 520 and a secret share 522.

In operation, the data 502 is divided into manageable blocks 504 to 510. These can be very much larger than blocks 104 to 110 of FIG. 1. The first block 504 is encrypted using a key 514 and any one of a number of standard encryption techniques (such as PGP) to generate cipher text 512. The key is of a smaller, more manageable size (typically 256 bits) than the block of data to be encrypted. The key is split into n secret shares 520 using a CRT encoding module 516 and technique described above with reference to FIG. 1 or FIG. 2.

In parallel, the cipher text is redundancy-encoded (e.g. using Reed-Solomon encoding) to create a larger block of text 518. Ideally, the redundancy encoding is such that any t out of n portions of the encoded text are sufficient to recover the original cypher text. Ideally, one block is encoded into n blocks from which any t blocks will permit recovery.

The redundancy encoded cipher text is split into n fragments 518. The final step is to produce shares, in which each secret share comprises one fragment of the cipher text and one share of the encryption key. Any t such shares will permit recovery of the key and recovery of the cipher text and decryption of the recovered cipher text using the recovered key.

Operation of the system of FIG. 5 is further described with reference to FIG. 6. Steps 600 to 630 are the same as steps 400 to 430 in FIG. 4.

Step 640 is the same as step 440 with the additional feature that an encryption key is selected. The manner of selection of the key is not important. The key is preferably smaller than $m_0$ but this is not a limitation. It can be split into blocks and processed as previously described with reference to FIG. 4.

Following step 640, there are two processes that can occur together or in any order. On the left, steps 650 and 660 encrypt the block and apply Reed-Solomon coding at least of the order n/t. I.e. for every t units (bits, characters, blocks) at least n are generated, so that only t units are required to recreate the original. In step 660, the RS encoded blocks are divided into n shares. (Note that the RS encoding can be done first, followed by the encryption.)

On the right, the key is processed in accordance with steps 450-470 previously described, also creating n shares.

At step 695 each share of RS encoded cipher text is combined with one share of the key, creating n shares each comprising part of the cipher text and part of the key. These shares are stored (as described above in relation to FIG. 4) and the process is repeated for the next block (step 640).

The encryption key is changed on a per-file basis. In other words, the same key is used to encrypt all the blocks of a single file. (Otherwise, a large file having many blocks would lead to many encryption keys, and the total length of the keys could be bigger than the length of the input file, which is inefficient.) For different files, the encryption key is randomly generated by a Cryptographically Secure Pseudo-Random Number Generator (CSPRNG).

The process (steps 640-695) is repeated until the last block has been encrypted and stored.

The combining in step 695 is carried out on the share level (rather than on the block level). It does not matter how many blocks a data share or a key share consists of.

For comparison purposes, RS significantly outperforms IDA in fragmenting bulky cipher texts and CRT significantly outperforms PSS in fragmenting encryption keys, and thus in combination, the above described RS-CRT hybrid scheme significantly outperforms as a whole a hybrid IDA-PSS scheme (referred to as is Krawczyk's Computational Secret Sharing and discussed above).

CRT is a perfectly secure secret sharing schemes in the sense that no share gives any partial information (unlike IDA and Reed-Solomon coding). When applied to protect an encryption key, no information whatsoever should be determined about the key unless: t secret shares or more were acquired by an attacker; and the attacker also acquired the associated meta-data that informs which secret shares are in the same group and how to combine them.

At least t of the shares of a given item of data are preferably stored on t independent platforms (e.g. independent cloud platforms). It is orders of magnitude more difficult for an attacker to simultaneously compromise t independent cloud platforms plus the owner of the meta-data than to compromise just one individual cloud. Hence the described system affords a very high level of assurance.

In the worst case of active adversaries, e.g. more than t cloud vendors collude and put all their secret shares together, a considerable amount of effort would still be needed to calculate by brute force a correct combination of secret shares out of huge numbers of possibilities.

The search space given by CRT meta-data is vast compared to other secret sharing schemes such as PSS. Thus, the described enhanced version of CRT affords a higher level of security than PSS, and the same conclusion is extensible to the derived RS-CRT hybrid scheme.

The invention claimed is:

1. A method of securely storing a target number comprising:
creating a set of n Chinese-remainder congruence pairs of numbers, each pair comprising a divisor and a remainder wherein the target number can be uniquely derived from any t out of the n pairs, wherein the divisors of the congruence pairs are members of an Asmuth-Bloom sequence of N members, wherein
the divisors are pre-selected such that any randomly selected n integers from the sequence are a valid Asmuth-Bloom sequence for any access structure (t, n) where $1<t\leq n\leq N$;
storing the n pairs of numbers; and
the lowest value, $m_0$ of the sequence has at least one more bit than the target number.

2. The method of claim 1 further comprising pre-storing the sequence of numbers or a subset thereof, from which to select the n integers.

3. The method of claim 1 wherein, in storing the n pairs of numbers, divisors are stored as indices in the sequence of N members.

4. The method of claim 1, wherein N is no greater than 255.

5. The method of claim 1, wherein the remainder is calculated from the divisor by
applying an integer $\alpha$,
calculating $S'=S+\alpha*m_0$ where S is the target number and $m_0$ is the lowest value in the sequence, and
dividing S' by the divisor.

6. The method of claim 5, wherein a is selected to ensure that $S+\alpha*m_0$ is
greater than the product of the largest (t−1) of the n integers of the sequence and
smaller than the product of the smallest (t) of the n integers of the sequence.

7. A computer system for securely storing a target number comprising:
a first memory for pre-storing members of a Mignotte or Asmuth-Bloom sequence of N divisors in a look-up table;
a selector input for selecting n divisors from the stored sequence;
at least one processor for creating a set of n Chinese-remainder congruence pairs of numbers, each pair comprising a different one of the selected n divisors and a remainder, such that the target number can be uniquely derived from any t out of then pairs; and
a second memory for storing the n pairs of numbers,
wherein the at least one processor is configured to represent target data as one or more binary target numbers, and wherein the lowest value, $m_0$ of the sequence has at least one more bit than the or each target number.

8. The system of claim 7, wherein the stored sequence of N divisors are pre-selected for storage such that any randomly selected n integers from the sequence are a valid Asmuth-Bloom sequence for any access structures (t, n) where $1<t\leq n\leq N$.

9. The system of claim 7 wherein the first memory pre-stores a plurality of Asmuth-Bloom sequences for different selectable access structures (t, n) where $1<t\leq n\leq N$.

10. The system of claim 8 further comprising a selector input for inputting t and n prior to creating the pairs of numbers.

11. The system of claim 7 wherein the second memory stores divisors as indices in the sequence of N members.

12. The system of claim 7 comprising a processor arrange to:
- select a value $\alpha$ as a function of t;
- calculate the remainder from the divisor by calculating $S'=S+\alpha*m_0$ where S is the target number and $m_0$ is the lowest value in the sequence and divide $S'$ by the divisor.

13. The system of claim 12, wherein a is selected to ensure that $S+\alpha*m_0$ is
- greater than the product of the largest (t−1) of the n integers of the sequence and
- smaller than the product of the smallest (t) of then integers of the sequence.

14. A method of decoding a target number comprising:
- receiving at least t shares of data from storage, each share comprising a congruence pair in the form of an index and a remainder;
- performing, for each share, a look-up using the index, to retrieve from a pre-stored Mignotte or Asmuth-Bloom sequence, a divisor corresponding to the index; and
- performing a modular multiplicative inverse computation to retrieve the target number from the t congruence pairs,
- wherein the lowest value, $m_0$ of the sequence has at least one more bit than the target number.

15. The method of claim 14, wherein the divisors of the sequence are pre-selected and pre-stored such that any randomly selected n integers from the sequence are a valid Asmuth-Bloom sequence for any access structure (t, n) where $1<t\leq n\leq N$.

16. The method of claim 14 further comprising using the retrieved target number as a key to decrypt data included in the received shares of data.

17. A computer system for decoding a target number configured to:
- pre-store a Mignotte or Asmuth-Bloom sequence previously used to encode the target number;
- receive at least t shares of data from storage, each share comprising a congruence pair in the form of an index and a remainder;
- perform, for each share, a look-up using the index, to retrieve from the pre-stored Mignotte or Asmuth-Bloom sequence, a divisor corresponding to the index; and
- perform a modular multiplicative inverse computation to retrieve the target number from the t congruence pairs,
- wherein the lowest value, $m_0$ of the sequence has at least one more bit than the or each target number.

18. The system of claim 17, wherein the divisors of the sequence are pre-selected and pre-stored such that any randomly selected n integers from the sequence are a valid Asmuth-Bloom sequence for any access structure (t, n) where $1<t\leq n\leq N$.

* * * * *